3,025,271
MIXED ESTERS OF CITRIC ACID AND
POLYMERS THEREOF
Peter J. Borchert, Elkhart, Ind., assignor to Miles Laboratories, Inc., Elkhart, Ind., a corporation of Indiana
No Drawing. Filed June 24, 1959, Ser. No. 822,426
18 Claims. (Cl. 260—78.3)

This invention relates to new compositions of matter and particularly to mixed esters of citric acid and polymers thereof. More specifically, this invention pertains to certain mixed (acylated) allyl-alkyl esters of citric acid which may be polymerized and copolymerized with other unsaturated monomers to yield valuable internally plasticized resins and these esters may be represented by the following structural formula:

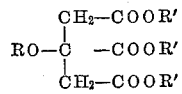

wherein R represents hydrogen or an acetyl group and wherein R' stands for allyl radicals and alkyl groups containing from 1 to 18 carbon atoms, with at least one R' being an allyl group and at least one $R_2$ being an alkyl group.

The subject compounds of this invention then are characterized by having one or two ester linkages with polymerizable terminal mono-ethylenically unsaturated radicals and one or two ester linkages with straight or branched chain saturated aliphatic radicals imparting to these mixed esters plasticizing properties. Although the R' substituent(s) in the above formula, where alkyl group(s), may be any straight or branched chain saturated aliphatic radical of from 1 to 18 carbon atoms, R' in the preferred embodiments of this invention is n-butyl, 2-ethylhexyl or octadecanyl groups.

The invention also pertains to (pre)polymers of these mixed (acylated) allyl-alkyl esters of citric acid as well as to copolymers thereof with each other and with other polymerizable unsaturated materials.

The mixed esters of this invention have new and valuable properties and are extremely useful for a variety of purposes. Due to their chemical structure, in particular due to the presence of one or more polymerizable allylic fractions and one or more alkyl radicals, such as are characteristic of plasticizers, these new esters may be prepolymerized, i.e., partially polymerized, or completely polymerized or copolymerized to yield valuable internally plasticized polymeric substances (resins) free of certain drawbacks encountered with "externally" plasticized resins, such as insufficient retention of the plasticizers due to their volatility or migration.

Thus, the mixed esters of this invention have utility as plasticizers and flexibilizers and they indeed represent a new class of plasticizers, so-called "internal plasticizers" with a built-in stabilizing ability.

In accordance with the invention these new esters were prepared by a step-wise method of esterification of citric acid with appropriate alcohols in the presence of p-toluene sulfonic acid as a catalyst and toluene as the azeotropic solvent at a temperature between 90 and 140° C. for a period of from 2 to 5 hours. The amount of catalyst used was 1 to 2% based on the weight of the citric acid monohydrate.

The respective reactants were, in the first-step esterification, citric acid in its monohydrate form and an appropriate monohydric alkanol, such as n-butanol, 2-ethylhexanol, etc., and, in the second-step esterification, the thus-produced mono- or dialkylcitrates and allyl alcohol.

The crude mixed esters, after stripping off the excess alcohol and azeotropic solvent, were purified by dry-neutralization or by one aqueous alkali wash with 3 to 5% sodium hydroxide followed by two water washes. Decolorization of the purified esters was achieved by treatment with oxidizing agents, such as hydrogen peroxide, hypochlorite, etc. in the presence of an inhibitor (hydroquinone or methylene di-β-naphthol) at 95–105° C. for a period of about 30 minutes.

As indicated by the above formula, the tertiary alcoholic group of these mixed citric acid esters was acylated by means of acetic anhydride as a further modification of the subject compounds of this invention. Acylation of the esters was effected immediately after stripping off the toluene. At about 100° C. acetic anhydride was added in such portions that the exothermic reaction did not exceed 110° C. Purification and bleaching procedures were the same as described above.

In the following examples the mode of preparation of the various congeners comprised in this new class of mixed citrates will be more specifically illustrated.

EXAMPLE I

*Preparation of Monoallyl Dibutyl Citrate*

In a 3-liter, 3-necked flask was charged 840 g. of citric acid monohydrate, 593 g. of n-butanol, 12 g. of p-toluene sulfonic acid and 155 g. of toluene. After azeotropic distillation for about 60 minutes, and separation of the required amount of water for the dibutyl ester and the water of hydration from citric acid (total 216 ml.), 275 g. of allyl alcohol was charged to the flask in such portions that the reaction temperature was between 115–120° C. After two to three hours a total of 315 ml. of water and allyl alcohol were recovered (theory—288 ml. water). Then carbon dioxide was bubbled through the mixture, while the temperature was increased to 140–145° C., and the azetroping solvent and excess alcohol were recovered by distillation.

The acid value of the crude ester was 11. The dark brown, transparent mixture was allowed to cool to room temperature and was then neutralized by adding 2 g. of solid anhydrous potassium carbonate with stirring for 30 minutes and filtered. The decolorization of the ester was achieved by treatment with $H_2O_2$ in the presence of an inhibitor. In this way the ester was bleached with 0.5 ml. of $H_2O_2$ (50%) at 95–105° C. in the presence of 0.2 g. of hydroquinone. After 30 minutes the ester was only slightly yellow in color.

Purification by distillation: 300 g. of crude ester was mixed with an equal amount of benzene and treated with 200 ml. of 3% aqueous sodium hydroxide, followed by two water washes. After drying with sodium sulfate and stripping off benzene, the mixture was distilled. The distilled product was a slightly yellow or colorless oil with the following physical constants: B.P., 174–175° C. (0.4 mm.). Sap. No.: Found—495; Theory—490. Ref. Index, 1.4531 (25° C.).

*Preparation of Acetyl Monoallyl Dibutyl Citrate*

Three hundred forty-four grams (344 g.) of monoallyl dibutyl citrate, 0.05 g. of hydroquinone and 0.5 g. of sulfuric acid were charged to a 1-liter, 3-necked flask with stirrer, thermometer and dropping funnel. The ester was heated to 95–97° C. and 107 g. acetic anhydride was then added to the mixture in portions so that the temperature did not exceed 105° C. This operation required about 30 minutes. The mixture was then heated for an additional hour at 105° C. Acetic acid was stripped off at 12 mm. pressure, keeping the reaction temperature between 50 and 80° C. The clear, bright red, crude acetyl-ester was allowed to cool and was then washed with an equal volume of water. The milky ester layer was separated and washed with an equal volume of 3–5% aqueous solution of sodium hydroxide at a temperature between 25 and 30° C. After two water washes 0.2 g. methylene-di-β-naphthol was added as an inhibitor. In order to evaporate dispersed and dissolved water, the ester was heated with stirring in a beaker at 95–105° C. When the water was evaporated, the acetyl ester became clear, and 2 ml. of $H_2O_2$ was added at 95° C. and stirring was continued for 30–60 minutes. After this bleaching procedure the final ester was only slightly yellow in color. The distilled ester was a light yellow to colorless oil with the following constants: B.P., 193–194° C. (2–3 mm.). Sap. No.: Found—550; Theory—581. Ref. Index, 1.4493 (25° C.).

EXAMPLE II

Preparation of Diallyl Monobutyl Citrate

The preparation of diallyl monobutyl citrate was similar to that of monoallyl dibutyl citrate, as described in Example I. After preparation of the monobutyl citrate (630 g. citric acid, 233 g. n-butanol, 140 g. toluene and 6 g. p-toluene sulfonic acid), the allyl alcohol (418 g.) was added. The distilled ester was a light yellow to colorless oil with the following constants: B.P., 163° C. (0.4 mm.). Sap. No.: Found—516; Theory—526. Ref. Index, 1.4598 (25° C.).

Preparation of Acetyl Diallyl Monobutyl Citrate

The preparation of acetyl ester was the same as described in Example I. The distilled product was a light yellow to colorless liquid with the following constants: B.P., 166° C. (0.4 mm.). Sap. No.: Found—608; Theory—620. Ref. Index, 1.4555 (25° C.).

EXAMPLE III

Preparation of Diallyl Mono-2-Ethylhexyl Citrate

The preparation of diallyl mono-2-ethylhexyl citrate was similar to that described in Example I. After preparation of the mono-2-ethylhexyl citrate (840 g. of citric acid. 520 g. of 2-ethylhexanol, 120 g. of toluene and 12 g. of p-toluene sulfonic acid), the allyl alcohol (507.5 g.) was added and the azeotropic distillation continued. After removal of the azeotroping solvent and the excess allyl alcohol "in vacuo," one-half (772 g.) of the crude ester was washed with 5% aqueous sodium hydroxide, followed by two water washes. Dispersed water present after the second water wash was removed by heating the purified ester in a beaker at 95–105° C. until cloudiness disappeared. Then 0.1 g. of hydroquinone inhibitor and 2 ml. of 50% $H_2O_2$ bleaching agent was added. The final ester had the following constants—Sap. No.: Found— 422; Theory—448. Ref. Index, 1.4503 (25° C.).

Preparation of Acetyl Diallyl Mono-2-Ethylhexyl Citrate

The second half (772 g.) of diallyl mono-2-ethylhexyl citrate, after esterification and removal of the azeotroping solvent (Example IV), was acetylated without addition of sulfuric acid. The crude ester was heated at 100° C. with 0.05 g. of inhibitor (methylene-di-β-naphthol). Two hundred and nineteen grams (219 g.) of acetic anhydride was charged in portions so that the temperature did not exceed 110° C. The mixture was then heated for an additional hour at 105 and 110° C. All subsequent operations were the same as described in Example I. After bleaching with $H_2O_2$ the ester became light (pole) yellow. Specifications—Sap. No.: Found—496; Theory—537. Ref. Index, 1.4587 (25° C.).

EXAMPLE IV

Preparation of Monoallyl Di-2-Ethylhexyl Citrate

The preparation of monoallyl di-2-ethylhexyl citrate was similar to that of monoallyl dibutyl citrate, as described in Example I. After reacting 840 g. of citric acid with 1,040 g. of 2-ethylhexanol in the presence of 12 g. of p-toluene sulfonic acid and 120 g. of toluene as azeotroping solvent, 275.5 g. of allyl alcohol was charged to the mixture and azeotroped. The crude ester was neutralized with 35 g. of solid $Ca(OH_2)$ at 35–45° C. added during 30 minutes. The filtered ester had an acid value of 6.2, corresponding to a content of 98–99% tri-ester. Constants—Sap. No.: Found—341; Theory—369. Ref. Index, 1.4593 (25° C.).

As pointed out above, the mixed allyl esters have utility as plasticizers and flexibilizers and may be (pre)polymerized to yield internally plasticized liquid resins, which possess valuable properties: low volatility, good heat and light stabilization, etc.

The use of mono- or difunctional allyl-monomers of citric acid esters with other mono- or polymeric materials results in cross-linked higher molecular weight materials. These products possess unusual solubility and hardness characteristics due to one, two or three saturated ester groups per molecule. The function of (pre)polymerized mixed allyl citrates, which are also able to copolymerize with certain mono- and polymeric materials is similar.

The mixed esters described in this inventon were (pre)polymerized with 1–5% perbenzoic acid or hydrogen peroxide as an initiator at temperatures ranging from 100–140° C. The (pre)polymerized esters are more or less clear, viscous liquids, which are soluble in alcohols and common organic solvents and which have utility as polymeric plasticizers with partial capability to copolymerize. The mono- or difunctional allyl monomers of citric acid described in this invention were copolymerized with various vinyl compounds, either by bulk polymerization or solution polymerization.

The following examples will illustrate more particularly the methods of polymerization and the great variety of possible products of polymerization, without limiting the scope of this invention.

EXAMPLE V

Copolymerization of Acetyl Triallyl Citrate and Acetyl Diallyl Monobutyl Citrate One hundred grams (100 g.) of acetyl triallyl citrate, 20 g. of acetyl diallyl monobutyl citrate, 200 g. of toluene and 3 g. of perbenzoic acid were heated under stirring for one hour between 105 and 110° C. An additional amount of 1 g. of perbenzoic acid dissolved in 10 ml. toluene was then charged to the reaction mixture; one hour later the same amount of perbenzoic acid was again added to the mixture. Total reaction time was between 3 and 4 hours. The mixture was then cooled and the copolymer was precipitated with 1,000 ml. of methanol. The white solid was isolated by filtration, dried in a vacuum oven for 2 hours and finely pulverized. Yield: 75–80 g. (63–67% of theory).

This co-prepolymerized solid is a free-flowing powder which is soluble in acetone, aromatic hydrocarbons and esters; it is insoluble in aliphatic solvents. It can be hardened to form insoluble, infusible resins by the action of heat and/or catalysts. Cross-linkaging occurs in solutions of the prepolymer in acetone or aromatic solvents, in the presence of 0.1–3% of perbenzoic acid, when applied as a film on metal or glass and heated to 120–150° C. for 10–20 minutes. A transparent, thermo-setting film results which has excellent adhesion and flexibility.

EXAMPLE VI

Copolymerization of an Unsaturated Polyester With Diallyl Monobutyl Citrate

A. Five grams (5 g.) of an unsaturated polyester (isophthalic acid, maleic acid and ethylene glycol) and 5 g. of diallyl monobutyl citrate were mixed together with 0.2 g. of perbenzoic acid and heated for 2 hours at a temperature between 120–140° C. The resulting copolymer is a transparent, rubber-like substance.

B. Five grams (5 g.) of another unsaturated polyester (maleic acid, phthalic acid and propylene glycol) was dissolved in 5 g. of diallyl monobutyl citrate by warming at 50–70° C. Then 0.2 g. of perbenzoic acid was admixed thereto and the mixture was heated for 20 minutes at 100° C. The resulting copolymer is a transparent, highly flexible and impact-resistant material.

EXAMPLE VII

*Prepolymerization of Diallyl Monobutyl Citrate*

One hundred grams (100 g.) of diallyl monobutyl citrate and 2 g. of perbenzoic acid were heated for 2 hours at a temperature between 120–140° C. After cooling, a highly viscous, clear oil resulted, which is soluble in aromatic hydrocarbons.

EXAMPLE VIII

*Prepolymerization of Diallyl Mono-2-Ethylhexyl Citrate*

One hundred ten grams (110 g.) of diallyl mono-2-ethylhexyl citrate and 3 g. of 50% hydrogen peroxide were heated under vigorous stirring in an open beaker at 140° C. An exotherm of the reaction carried the temperature to 153° C. The mixture was allowed to cool slowly to room temperature. The highly viscous polymer is soluble in aromatic hydrocarbons.

EXAMPLE IX

*Copolymerization of Ethyl Acrylate With Diallyl Monobutyl Citrate*

Five grams (5 g.) of ethyl acrylate, 5 g. of diallyl monobutyl citrate and 0.2 g. of perbenzoic acid were heated in a water bath at 80–100° C. for 3 hours. The resulting polymer is a completely transparent, soft, ropy substance.

EXAMPLE X

*Copolymerization of Diallylphthalate With Diallyl Monobutyl Citrate*

Five grams (5 g.) of diallylphthalate, 5 g. of diallyl monobutyl citrate and 0.5 g. of perbenzoic acid were heated at a temperature of 100 and 120° C. for 1 hour. The resulting copolymer is a transparent, highly elastic substance.

It is, of course, to be understood that the foregoing examples are illustrative only and that numerous changes can be made in the ingredients, conditions and proportions set forth without departing from the spirit of the invention as set forth in the appended claims.

In summary, this invention relates to mixed (acylated) allyl-alkyl esters of citric acid, which represent a new class of "internal plasticizers" and which may be (pre)-polymerized with each other as well as with other polymerizable unsaturated materials to yield useful internally plasticized substances.

The esters of this invention have the following general formula:

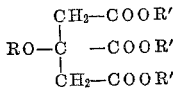

wherein R is selected from the group consisting of hydrogen and an acetyl radical and R' is selected from the group consisting of allyl radicals and alkyl radicals of from 1 to 18 carbon atoms, at least one R' being an allyl group and at least one R' being an alkyl group.

These mixed esters as well as polymers thereof are prepared by general methods which are well known in the art.

What is claimed is:

1. A composition of matter having the formula:

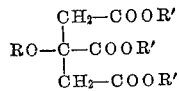

wherein R is an acetyl radical and R' is selected from the group consisting of allyl radicals and alkyl radicals of from 1 to 18 carbon atoms, at least one R' being an allyl group and at least one R' being an alkyl group.

2. Acetyl dibutyl monoallyl citrate.
3. Acetyl diallyl monobutyl citrate.
4. Acetyl diallyl mono-2-ethylhexyl citrate.
5. Acetyl-di-2-ethylhexyl monoallyl citrate.
6. Homopolymers of compounds having the formula:

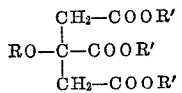

wherein R is an acetyl radical and R' is selected from the group consisting of allyl radicals and alkyl radicals of from 1 to 18 carbon atoms, at least one R' being an allyl group and at least one R' being an alkyl group.

7. A homopolymer of the composition defined by claim 2.
8. A homopolymer of the composition defined by claim 3.
9. A homopolymer of the composition defined by claim 4.
10. A homopolymer of the composition defined by claim 5.
11. Copolymers of at least two members of the group consisting of compounds having the formula:

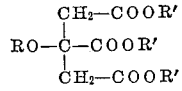

wherein R is an acetyl radical and R' is selected from the group consisting of allyl radicals and alkyl radicals of from 1 to 18 carbon atoms, at least one R' being an allyl group and at least one R' being an alkyl group.

12. Copolymers of (a) a compound of the formula:

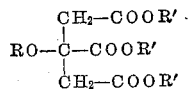

wherein R is an acetyl radical and R' is selected from the group consisting of allyl radicals and alkyl radicals of from 1 to 18 carbon atoms, at least one R' being an allyl group and at least one R' being an alkyl group; and (b) a different ethylenically unsaturated compound which is copolymerizable with compound (a) hereinabove.

13. A copolymer of ingredients including (a) about 20 parts by weight of a compound of the formula:

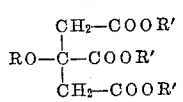

wherein R is an acetyl radical and R' is selected from the group consisting of allyl radicals and alkyl radicals of from 1 to 18 carbon atoms, at least one R' being an allyl group and at least one R' being an alkyl group; and (b) about 100 parts by weight of acetyl triallyl citrate.

14. A copolymer of ingredients including (a) a compound of the formula:

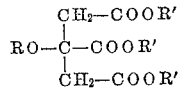

wherein R is an acetyl radical and R' is selected from the group consisting of allyl radicals and alkyl radicals of from 1 to 18 carbon atoms, at least one R' being an allyl group and one R' being an alkyl group; and (b) diallyl phthalate.

15. A copolymer of ingredients including (a) a compound of the formula:

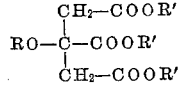

wherein R is an acetyl radical and R' is selected from the group consisting of allyl radicals and alkyl radicals of from 1 to 18 carbon atoms, at least one R' being an allyl group and at least one R' being an alkyl group; and (b) ethyl acrylate.

16. A copolymer of ingredients including (a) a compound of the formula:

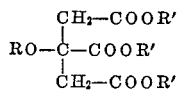

wherein R is an acetyl radical and R' is selected from the group consisting of allyl radicals and alkyl radicals of from 1 to 18 carbon atoms, at least one R' being an allyl group and at least one R' being an alkyl group; and (b) an unsaturated polyester.

17. A member of the group consisting of the homopolymers of compounds having the formula

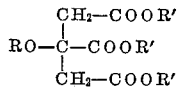

wherein R is an acetyl radical and R' is selected from the group consisting of allyl radicals and alkyl radicals of from 1 to 18 carbon atoms, at least one R' being an allyl group and at least one R' being an alkyl group; copolymers of said compounds respectively with each other and copolymers of said compounds respectively with other compounds not included within said formula and having an ethylenically unsaturated radical and being copolymerizable with said compounds.

18. A copolymer of ingredients including (a) about 20 parts by weight of acetyl diallyl monobutyl citrate and (b) about 100 parts by weight of acetyl triallyl citrate.

References Cited in the file of this patent

UNITED STATES PATENTS

| | | |
|---|---|---|
| 2,062,917 | Lawson | Dec. 1, 1936 |
| 2,275,467 | Pollack et al. | Mar. 10, 1942 |
| 2,332,896 | D'Alelio | Oct. 26, 1943 |
| 2,437,962 | Kropa | Mar. 16, 1948 |
| 2,445,189 | Shokal | July 16, 1948 |
| 2,545,184 | Whitehill | Mar. 13, 1951 |